Sept. 24, 1946.  L. H. STEANS ET AL  2,408,153
FASTENING DEVICE
Filed April 14, 1943
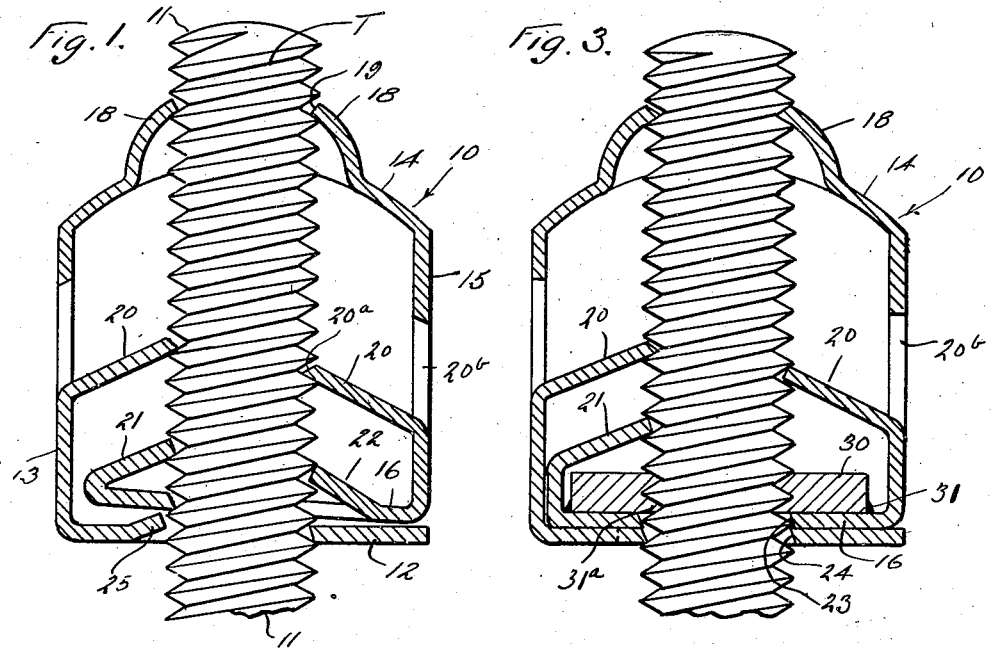
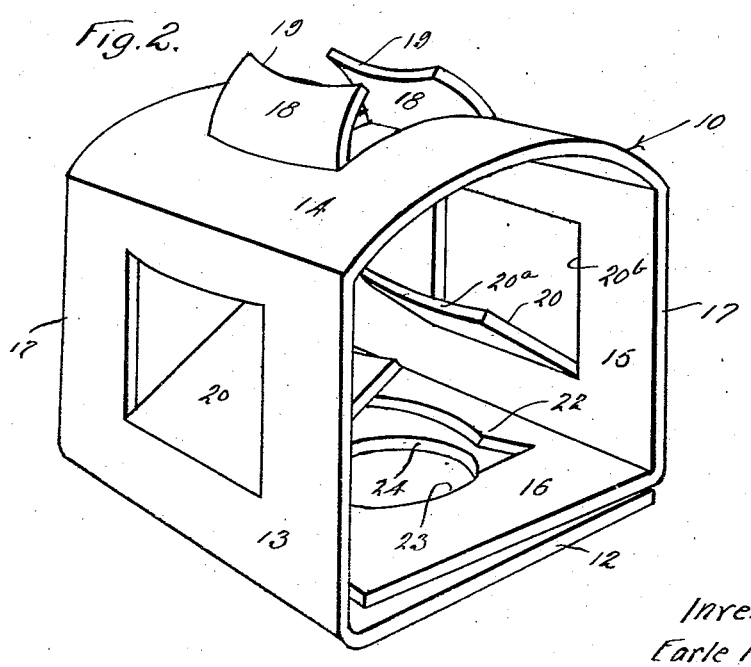
Inventors
Earle R Andrews and
Lionel H. Steans
by W. H. Maxwell
Attorney Patented Sept. 24, 1946

2,408,153

UNITED STATES PATENT OFFICE 2,408,153

FASTENING DEVICE

Lionel H. Steans and Earle R. Andrews,
Los Angeles, Calif.

Application April 14, 1943, Serial No. 482,950

4 Claims. (Cl. 151—14)

This invention relates to securing or fastening devices and relates more particularly to a fastener or nut for use on studs, screws, bolts, shafts, etc. A general object of this invention is to provide a practical, effective and very dependable nut or clip that may be quickly and easily applied or installed.

Another object of this invention is to provide a securing clip or nut that may be merely slid on the bolt to its final position or to its approximate position and then securely locked or engaged on the bolt by a few relative turns between the bolt and nut. The nut of the invention may be easily and quickly brought to its operative position by merely sliding it along the bolt, and will remain in this position until deliberately removed. In most instances, it will be desirable to tighten the nut against the work and to lock or secure the nut onto the bolt when it is brought against the work and this is easily done by giving the nut and/or the bolt a few turns with a wrench, or the like.

Another object of this invention is to provide a clip or nut of the character referred to embodying one, two or more pairs of parts for gripping and locking with the pin, shaft or bolt, the parts being so related and connected that they mutually contribute to the gripping of the bolt. The gripping parts of each pair of such parts are carried by the opposite side portions of a continuous box-like loop or stock and the parts are formed and disposed so that their engagement with the bolt tends to spread the sides of the loop or box-like structure and thus causes the nut to securely lock onto the bolt. The formation and disposition of the gripping parts are such that their individual gripping action is augmented by reason of the flexibility and resiliency of the box-like loop which forms the body of the nut and the engagement of the several parts with the bolt further causes the box-like body to bind onto the bolt.

Another object of this invention is to provide a clip, nut or fastener of the character referred to that has full and extensive engagement with the work. The base of the device is flat and broad to have ample cooperation with the face of the work.

Another object of this invention is to provide a clip or nut of the character referred to in which the tightening of the nut, as by rotation on the bolt, results in the positive inward projection of one or more lock parts against or into the thread of the bolt, securely and dependably locking the nut on the bolt.

Another object of this invention is to provide a clip or nut of the character referred to in which a base portion of the nut acts as a washer. The loop or box-like structure of the nut embodies overlapping portions at its base. One of these overlapping portions has gripping parts which have binding or gripping engagement with the opposite sides of the bolt and the other overlapping portion comes into engagement with the face of the work and functions in a manner resembling a washer.

Another object of this invention is to provide a nut of the character mentioned which carries a thread for cooperating with the thread of the bolt and a plurality of gripping parts for gripping the thread of the bolt, thus embodying the features and advantages of a conventional threaded nut and the further advantages of a clip fastener or locking device.

Another object of this invention is to provide a securing clip or nut of the character mentioned that is inexpensive to manufacture and that is convenient to use.

The various objects and features of our invention will be fully understood from the following detailed description of typical preferred forms and applications of the invention, throughout which description reference is made to the accompanying drawing, in which:

Fig. 1 is a longitudinal detailed sectional view of the nut on the bolt before being tightened down. Fig. 2 is an enlarged perspective view of the nut of Fig. 1, and Fig. 3 is a view similar to Fig. 1 illustrating another form of the invention.

The form of the invention illustrated in Figs. 1 and 2 of the drawing may be described, generally, as a box-like structure or body 10 having sets of gripping parts for cooperating with a stud, screw, bolt, pin shaft, rivet or the like, 11.

In accordance with the invention the body 10 is a single, continuous length of sheet strap or plate stock shaped to form a box-like loop structure. The material is shaped and bent to have what I will term a base portion 12, a side 13 rising from the base portion 12, a top 14 extending from the side 13, a side 15 extending downwardly from the top 14 and a second or inner base portion 16 extending inwardly from the lower end of the side 15. It is to be understood that the several parts just mentioned are integrally joined one with the other and form portions of a continuous loop of generally rectangular shape.

The body 10 is proportioned so that it may be readily engaged by a wrench or the like. The edges 17 of the body 10 are straight and parallel so that they may be engaged by the wrench and the opposite sides 13 and 15 are flat and generally parallel to be readily engaged by the wrench. In practice the body 10 may be substantially square in transverse cross section. The base portion 12 is flat and is adapted to engage against the work. The top 14 may be flat or may be convex as illustrated in the drawing. The inner base portion 16 initially slopes upwardly and inwardly from its line of connection with the side 15. The base portions 12 and 16 are not directly connected or joined and are free for relative movement. It is to be observed that the body 10 just described is a simple, inexpensive one-piece element.

It is a feature of the invention that the fastener or nut may be provided with as many gripping parts or lock parts as required. Thus the nut may have two, three, four, five or more locking or gripping parts. The clamp, clip, nut or fastener of the invention may be used on pins, shafts, rivets, and the like that are unthreaded and may be used on screws, bolts, studs, and the like, that are threaded, ribbed or corrugated. In the particular case illustrated the gripping parts cooperate with the thread T of a bolt, or the like, it being understood that this is merely one typical use of the invention. In the particular case illustrated there are seven grip or lock parts in addition to the base portions 12 and 16 which also grip or lock with the thread T of the bolt 11.

The top 14 may be provided with a pair of locking or gripping parts 18. The top 14 has an opening for receiving the bolt 11 and the gripping parts 18 are arranged at opposite sides of the opening to cooperate with the bolt. The parts 18 may be formed by making two parallel cuts in the top 14 and bending or striking up the metal between these cuts. The locking or gripping parts 18 may be straight or bowed, as preferred, and the inner or active edges 19 of the parts 18 may be straight or curved. In the particular case illustrated the edges 19 are concave, it being understood that they may be straight, convex, or waved, as desired. The active edges 19 of the parts 18 are not directly opposite but are offset axially of the bolt, to have more effective binding or gripping cooperation with the helical thread T of the bolt. The active edges 19 of the gripping parts 18 may be beveled or pitched to have a more effective locking engagement in the thread T and the gauge of the metal of which the body 10 is formed may be such that the edges 19 readily engage or lock in the thread T.

The body sides 13 and 15 may carry as many locking or gripping parts as required. In the particular construction illustrated in the drawing there is a pair of gripping parts 20 carried by the sides of the nut, it being understood that this is merely illustrative. The gripping parts 20 are in the nature of tongues or fingers projecting inwardly from the sides 13 and 15 to engage with the thread T. The parts 20 may be formed by making C, V or U-shaped cuts 20b in the sides 13 and 15 and bending the material from the sides. The lower edges of the parts 20 are integrally joined with the sides 13 and 15 and the parts slope upwardly and inwardly to have their inner or active edges 20a in position for cooperation with the bolt 11. It may be preferred to make the upper walls of the U-shaped cuts 20b in the sides 13 and 15 pitched or angular so that the active edge portions of the parts 20 will be V-shaped to more effectively fit and lock in the thread T of the bolt. Furthermore, the active edges 20a of the parts 20 may be concave, convex or waved. In the particular case illustrated the edges 20a are concave to have more extensive engagement with the thread T and are slightly pitched or waved to have better locking engagement with the thread.

As best illustrated in Fig. 1 of the drawing the gripping parts 20 are axially staggered or offset, the part 20 at the lefthand side of Fig. 1 being in a plane slightly above the plane of the part 20 at the righthand side. As a result of this offsetting of the parts 20 their engagement with the thread T tends to twist or tilt the nut to provide a better locking or gripping action. The gripping parts 20 may be flat and straight, as shown in the drawing, or if desired may be bowed like the above described parts 18. It is to be observed that the gripping parts 20 are carried by the side parts 13 and 15 which are free or unconnected at their lower ends so that the cooperation of the parts 20 with the thread T tends to spread the sides 13 and 20 and thus causes the base portions 12 and 16 to lock onto the bolt 11.

The base portion 16 is preferably provided with a set or pair of lock parts or gripping parts 21 and 22. An opening 23 is formed in the base portion 16 to pass the bolt 11. The axis of the opening 23 is pitched with respect to the plane of the portion 16 so that the walls of the opening may bite into the thread T. The lock or grip part 21 is formed by bending back the material at the inner extremity of the base portion 16. The part 21 is pitched upwardly and inwardly to have its edge cooperate with the bolt thread T. The part 22 cooperates with the bolt 11 in a plane below the plane occupied by the active edge of the gripping part 21 to obtain a better locking or gripping action. The active edges of the gripping parts 21 and 22 may be straight, pitched or waved, as desired. From an inspection of Fig. 1 of the drawing it will be seen that the gripping parts 18, 20 and 22 at one side of the nut have their active edges below the active edges of the complementary gripping parts at the other side of the nut. This aids in causing the nut to lock or bind on the bolt.

In addition to the locking or gripping parts 18, 20, 21 and 22, one or more gripping parts may be provided on the base portion 12. An opening 24 is provided in the base portion 12 to receive the bolt 11. In the construction illustrated a single gripping part 25 is provided on the base portion 12 at one side of the opening 24. The gripping part 25 may be formed by making a U-shaped cut in the base portion 12 and then bending up the metal outlined by the cut. The gripping part 25 is located under the free or outer part of the base portion 16 and its upper corner or edge is engageable by the base portion 16 as will be later described. In practice the gripping part 25 may be relatively short. The opening 24 may be formed so that its wall is pitched with respect to the plane of the base portion 12 to have effective gripping engagement with the thread T and the active edge of the gripping part 25 may be shaped to have the most effective gripping engagement with the thread.

It is to be observed that all of the gripping parts 18, 20, 21, 22 and 25 slope upwardly and toward the bolt 11 so that the nut may be readily slid downwardly along the bolt. The several gripping parts flex or spring outwardly and upwardly as they ratchet over the thread T. For example, if there is an axial force tending to displace the nut from the bolt the gripping parts 20 tend to swing downwardly and, therefore, inwardly, into tighter engagement with the thread T. The same is true of the gripping parts 18, 21, 22 and 25. The walls of the openings 23 and 24 engage with the thread T and are pitched to have dependable locking cooperation with the thread to aid in retaining the nut on the bolt. Any axial force which tends to displace the nut from the bolt tends to straighten the gripping parts 20 and this causes an outward force to be applied to the sides 13 and 15. When the gripping parts 20 move toward a position normal with respect to the axis of the bolt 11 the sides 13 and 15 tend to move away from the bolt and the walls of the openings 23 and 24 are brought into tighter cooperation with the thread T. From the above it will be seen that the securing clip or nut of the present invention has gripping or locking engagement with the bolt at a multiplicity of spaced points and dependably resists displacement.

It is usually preferred to bend or shape the active edges of the parts 18, 20, 21, 22 and 25 to have a helical pitch for cooperating with the thread T. This facilitates the threading of the nut on the bolt if it is desired to finally tighten or lock the nut against the work. Assuming the nut has been moved along the bolt to a position at the work a limited relative turning between the nut and the bolt will bring the nut into tight engagement with the work and will lock the nut on the bolt. The threading of the nut assists in actuating the gripping parts 18, 20, 21 and 22 into tight engagement with the thread T and causes the base portion to be drawn down toward the base portion 12. When this occurs the base portion 16 forces the gripping part 25 downwardly so that its active edge is positively gripped with the thread T. It is to be observed that the base portion 12 which engages the work serves as a washer while the base portion 16 carries the gripping parts 21 and 22 to assist in locking the nut on the bolt. The nut applied to the bolt as above described will effectively resist displacement and will not loosen when subjected to vibration. However, if it is desired to remove the nut relative rotation between the nut and the bolt in the correct direction unthreads the nut from the bolt.

In the embodiment of the invention illustrated in Fig. 3 of the drawing the body 10 and the gripping parts 18, 20 and 21 may be the same as described above. In this form of the invention the gripping part 22 is not employed but the gripping part 25 may be used if desired. A plate 30 is provided on the inner or upper surface of the base portion 16. The plate 30 is welded to the base portion 16 as at 31 to be integrally joined with the base portion and body. The plate 30 has a central opening registering with the opening 23 and provided with a thread 31ᵃ for mating with the thread T of the bolt.

In employing the nut of Fig. 3 the nut is threaded along the bolt 11 in the usual manner. When the base portion 12 engages the work its movement is stopped and upon continued turning between the nut and bolt the nut is locked on the bolt. It will be seen that the thread 31ᵃ cooperating with the thread T draws the base portion 16 down against the base portion 12 to positively force the gripping part 25 inward against the thread T. The gripping parts 18, 20 and 21 function as above described to lock with the thread T and the walls of the openings 23 and 24 cooperate with the thread to aid in securing the nut on the bolt. The fastener or fastening device of the invention has many uses. It may be employed as a nut, clamp or clip, or as a bracket or element of a bracket assembly. It will be apparent that the device may be modified in size, shape, etc. to adapt it for its different uses.

Having described only typical preferred forms and applications of our invention, we do not wish to be limited or restricted to the specific details herein set forth, but wish to reserve to ourselves any variations or modifications that may appear to those skilled in the art or fall within the scope of the following claims.

Having described our invention, we claim:

1. A fastening device for use on a threaded bolt including a length of material bent into the form of a substantially rectangular loop having a first base portion, a side extending upwardly from the first base portion, a top extending from the side, a second side extending downwardly from the top and a second base portion extending inwardly from the second side to be in overlying relation to the first base portion, said base portions and top having openings for receiving the bolt, inturned parts on the two sides sloping upwardly and inwardly to engage the thread of the bolt, an upwardly and inwardly projecting part on the first base portion engageable with the thread of the bolt, and at least one upwardly and inwardly projecting part on the second base portion for engaging the thread of the bolt, the said base portions being related for relative movement and the last named part being pressed against the thread of the bolt by said relative movement.

2. A fastening device for use on a threaded bolt including a length of material bent into the form of a substantially rectangular loop having a first base portion, a side extending upwardly from the first base portion, a top extending from the side, a second side extending downwardly from the top and a second base portion extending inwardly from the second side to be in overlying relation to the first base portion, said base portions and top having openings for receiving the bolt, opposed integral parts struck from the sides to project upwardly and inwardly therefrom so that they engage with the thread of the bolt, and integral parts struck from the top to project upwardly and inwardly therefrom so that they engage with the thread of the bolt, said parts at one side of the bolt being higher than said parts at the other side of the bolt.

3. A fastening device for use on a threaded bolt including a length of material bent into the form of a substantially rectangular loop having a first base portion, a side extending upwardly from the first base portion, a top extending from the side, a second side extending downwardly from the top and a second base portion extending inwardly from the second side to be in overlying relation to the first base portion, said base portions and top having openings for receiving the bolt, opposed inturned parts on the two sides sloping upwardly and inwardly to engage the thread of the bolt, the walls of said openings in the base portions being pitched and said base portions being relatively movable so that the pitched walls of the openings may lock with the thread of the bolt.

4. A fastening device for use on a threaded bolt including a length of material bent into the form of a substantially rectangular loop having a first base portion, a side extending upwardly from the first base portion, a top extending from the side, a second side extending downwardly from the top and a second base portion extending inwardly from the second side to be in overlying relation to the first base portion, said base portions and top having openings for receiving the bolt, inturned parts on the two sides sloping upwardly and inwardly to engage the thread of the bolt, a plate integrally joined with said second base portion and having an opening for receiving the bolt, a thread on the wall of the last named opening for mating with the thread of the bolt, and a lock part on said first base portion forced against the thread of the bolt by said second base portion.

LIONEL H. STEANS.
EARLE R. ANDREWS.